May 20, 1930.   D. L. Z. FISHER   1,759,048
ANIMAL TRAP
Filed April 25, 1928

Inventor
Dewey L. Z. Fisher
By Adam E. Fisher
Attorney

Patented May 20, 1930

1,759,048

UNITED STATES PATENT OFFICE

DEWEY L. Z. FISHER, OF CRYSTAL SPRINGS, ARKANSAS

ANIMAL TRAP

Application filed April 25, 1928. Serial No. 272,629.

My invention relates to animal traps and more particularly to that type generally known as box traps.

The main object is to provide a trap which will catch the animal alive and securely cage the same, and in the case of a valuable fur bearing animal cannot injure its fur in attempting to escape.

Another object is to provide an efficient trap, simple in construction and which will have a bait receiving compartment screened off from the main trap compartment, thus allowing the use of live bait when desired.

With these and other objects in view, the invention resides in the novel construction and arrangement of the several parts as hereinafter set forth and claimed.

In the drawing

Figure 1:
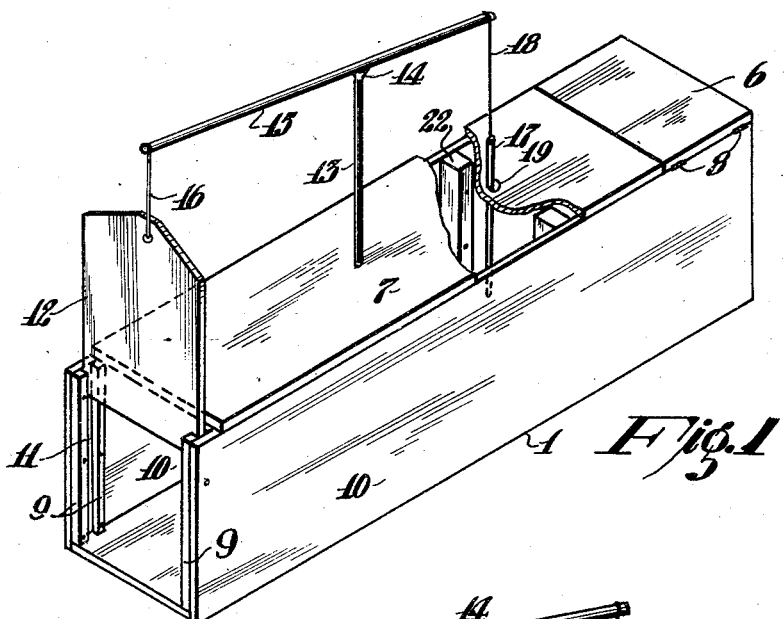
Figure 1 is a perspective view, partly broken away, of my trap as set ready to receive an animal.
Figure 2:
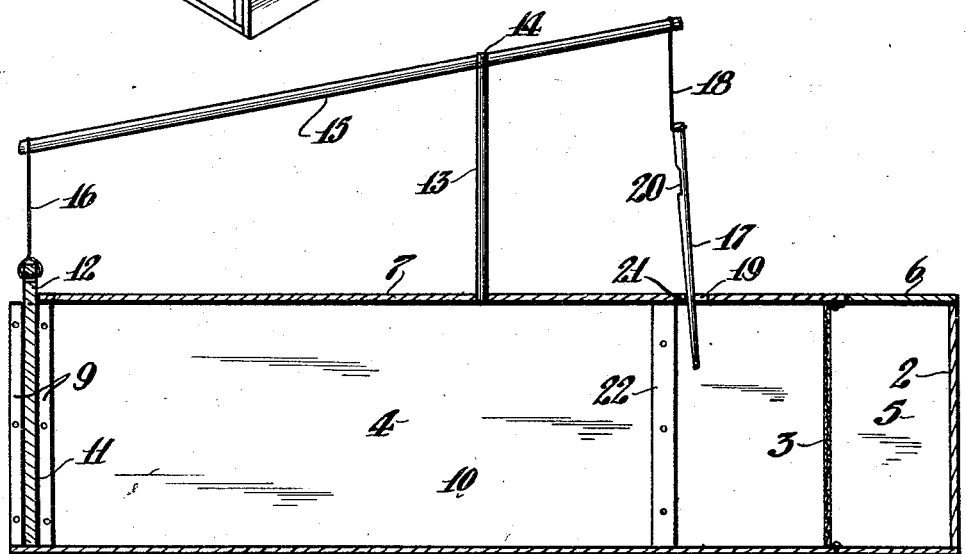
Figure 2 is a longitudinal vertical section in the sprung or released position.

In carrying out my invention, I provide an elongated rectangular box 1 of suitable material. The said box 1 is open at one end and closed at the other by the rear wall 2 and a wire screen partition 3 is secured within the box near the said rear wall 2 and spaced therefrom. Thus the box is divided into a trap chamber 4 and bait chamber 5. A portion 6 of the top 7 over the bait chamber 5 is hinged at 8 so that the same may be opened to place bait (not shown) in the trap. At the front or open end of the trap, spaced cleats 9 are secured vertically upon the side wall 10 to form slideways 11 for a trap door 12. The top 7 does not extend fully forward over the walls 10 but is cut short, as shown, to allow the trap door 12 to slide freely in a vertical direction to open and close the trap.

Mounted vertically upon the top 7 is a post 13 having its upper end 14 forked or grooved to receive the lever 15. The forward end of the lever 15 is secured to the trap door 12 by a cable 16 and the rear end is secured to a trigger 17 by a cable 18. The trigger 17 is adapted to be loosely positioned in an aperture 19 in the top 7 and has a square shouldered notch 20 for a purpose to be stated.

Figure 3:
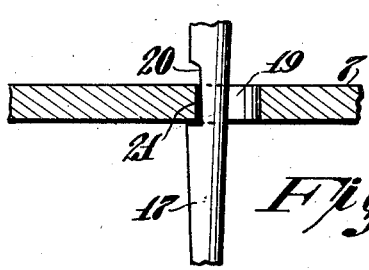
Figure 3 is an enlarged detail of the trigger and a portion of the trap box.

In the use and operation of the trap, the rear end of the lever 15 fulcrumed upon the post 13, is drawn downward until the trap door 12 is raised as shown in Figure 1, and the notch 20 in the trigger 17 will engage the forward margin 21 of the aperture 19 as shown in Figure 3 and retain the trap door in the set position.

The animal upon entering the trap and attempting to reach the bait in the bait chamber 5 will strike the trigger 17 and release the notch 20 from the margin of the aperture 19, allowing the door 12 to fall of its own weight and trap the animal.

To facilitate the rapid dropping of the trap door 12, the lever 15 is preferably fulcrumed upon a rear or off center point upon the post 13 as shown.

Shoulder pieces 22 are vertically secured upon the inner sides of the walls 10 adjacent the trigger aperture 19 as shown so that the animal is obliged to strike the trigger 17 before it can reach the bait chamber.

The trap may be made of a variety of materials and in different sizes for use in catching large or small animals.

The assembly and arrangement of the elements as here shown are merely illustrative of a preferred embodiment of my invention, and it is understood that I may vary the structural details as desired within the scope of the appended claim.

I claim:

In an animal trap, an elongated box open at its front end and closed at the other end, the said box having a trigger aperture through the rear portion of its top; a wire screen partition secured within the box near the rear wall and dividing the box into a frontal trap chamber and a rear bait chamber; a door for the bait chamber; shoulder pieces vertically secured upon the inner sides of the walls of the box adjacent the said trigger aperture of the top for forming a relatively narrowed passage way; a trap door mounted at the frontal and open end of the box and adapted for vertical, sliding movement; a post upon the top of the box; a lever pivoted upon the post and having its forward end loosely connected with the said trap door; and a trigger pin loosely passed through the said trigger aperture of the top of the box between the said shoulder pieces, and loosely connected at its upper end with the free end of the said lever, the said trigger pin having a notch cut therein for engaging the margin of the said trigger aperture to hold the said trap door in open position.

In testimony whereof I affix my signature.

DEWEY L. Z. FISHER.